(12) United States Patent
Kajioka et al.

(10) Patent No.: US 8,575,046 B2
(45) Date of Patent: Nov. 5, 2013

(54) SMC SHEET AND METHOD FOR MANUFACTURING THE SAME

(75) Inventors: Nobuyoshi Kajioka, Aki-gun (JP); Hiroyuki Hamada, Kyoto (JP); Asami Nakai, Kyoto (JP)

(73) Assignees: Daikyonishikawa Corporation, Hiroshima (JP); National University Corporation Kyoto Institute of Technology, Kyoto (JP)

( * ) Notice: Subject to any disclaimer, the term of this patent is extended or adjusted under 35 U.S.C. 154(b) by 845 days.

(21) Appl. No.: 12/121,747

(22) Filed: May 15, 2008

(65) Prior Publication Data

US 2008/0287021 A1 Nov. 20, 2008

(30) Foreign Application Priority Data

May 18, 2007 (JP) .................. 2007-133077

(51) Int. Cl.
*B32B 27/04* (2006.01)
*B32B 27/42* (2006.01)
*B32B 5/26* (2006.01)

(52) U.S. Cl.
USPC ........... 442/251; 442/246; 442/247; 442/252; 442/319; 428/301.4; 428/192; 428/193; 428/213

(58) Field of Classification Search
USPC ............. 442/59, 63, 153, 156, 161, 179, 180, 442/218–220; 428/36.2, 36.4, 293.4, 294.4, 428/295.2, 297.4, 301.4
See application file for complete search history.

(56) References Cited

U.S. PATENT DOCUMENTS

| | | | | |
|---|---|---|---|---|
| 3,889,035 A | * | 6/1975 | Jakes | 442/319 |
| 3,903,343 A | * | 9/1975 | Pfaff | 428/168 |
| 5,560,985 A | * | 10/1996 | Watanabe et al. | 442/245 |
| 5,783,278 A | * | 7/1998 | Nishimura et al. | 428/102 |
| 5,854,317 A | | 12/1998 | Rinz | |
| 6,666,310 B1 | * | 12/2003 | Berreth et al. | 188/251 A |

FOREIGN PATENT DOCUMENTS

| | | |
|---|---|---|
| JP | S53-140375 | 12/1978 |
| JP | 2-34308 A | 2/1990 |
| JP | 2001-115001 | 4/2001 |
| JP | 2001-279077 | 10/2001 |
| JP | 2002-515080 A | 5/2002 |

OTHER PUBLICATIONS

Office Action dated Jul. 23, 2010 issued by German Patent Office in corresponding German Patent Application No. 10 2008 024 246.2-43.

* cited by examiner

*Primary Examiner* — Jennifer A Steele
(74) *Attorney, Agent, or Firm* — Roberts Mlotkowski Safran & Cole, P.C.

(57) ABSTRACT

A SMC sheet includes: a sheet material body made of a resin compound containing uncured thermosetting resin; and a fiber sheet embedded as an intermediate layer in the sheet material body and impregnated with the thermosetting resin of the sheet material body. Short fiber is distributed on at least one side of the fiber sheet in the sheet material body.

6 Claims, 4 Drawing Sheets

SMC SHEET AND METHOD FOR MANUFACTURING THE SAME

BACKGROUND OF THE INVENTION

1. Field of the Invention

The present invention relates to a SMC sheet (sheet molding compound sheet) and a method for manufacturing it.

2. Description of Related Art

As a SMC sheet, a sheet is known in which glass short fiber or the like is distributed in a sheet material body made of uncured thermosetting resin. The SMC sheet subjected to press forming or the like is widely used in composite materials for manufacturing housing associated components, automobile associated components, and other industrial components.

Japanese Examined Patent Application Publication no. 2-34308 discloses a method of manufacturing an exterior component for an automobile excellent in outer appearance by using a SMC sheet in which glass short fiber is distributed in a sheet material body.

Japanese Unexamined Patent Application Publication (Translation of PCT Application) No. 2002-515080 discloses a method of manufacturing a SMC sheet in which glass fiber is cut and distributed onto an unsaturated polyester resin layer on a carrier film and the thus obtained sheet is laid over another unsaturated polyester resin coated carrier film.

SUMMARY OF THE INVENTION

The present invention has its object of minimizing, in a product formed of a SMC sheet, a difference in bending strength between a part corresponding to the central part of the SMC sheet and a part corresponding to the peripheral part thereof and imparting high stiffness, high strength, and high toughness to the product.

A SMC sheet in accordance with the present invention includes: a sheet material body made of a resin compound containing uncured thermosetting resin; and a fiber sheet embedded as an intermediate layer in the sheet material body and impregnated with the thermosetting resin of the sheet material body, wherein short fiber is distributed on at least one side of the fiber sheet in the sheet material body.

A SMC sheet manufacturing method in accordance with the present invention includes the steps of: forming a lower resin layer made of a resin compound containing uncured thermosetting resin on a carrier film; forming a fiber sheet on the lower resin layer; forming an upper resin layer made of a resin compound containing uncured thermosetting resin on the fiber sheet; allowing the fiber sheet to be mechanically impregnated with the thermosetting resins of the lower and upper resin layers; and distributing short fiber onto the lower resin layer; and/or distributing short fiber onto the fiber sheet.

BRIEF DESCRIPTION OF THE DRAWINGS

Other objects and aspects of the invention will become apparent from the following description of an embodiment with reference to the accompanying drawings in which.

DETAILED DESCRIPTION OF THE PREFERRED EMBODIMENT

An embodiment of the present invention will be described below with reference to the accompanying drawings.

Figure 1:
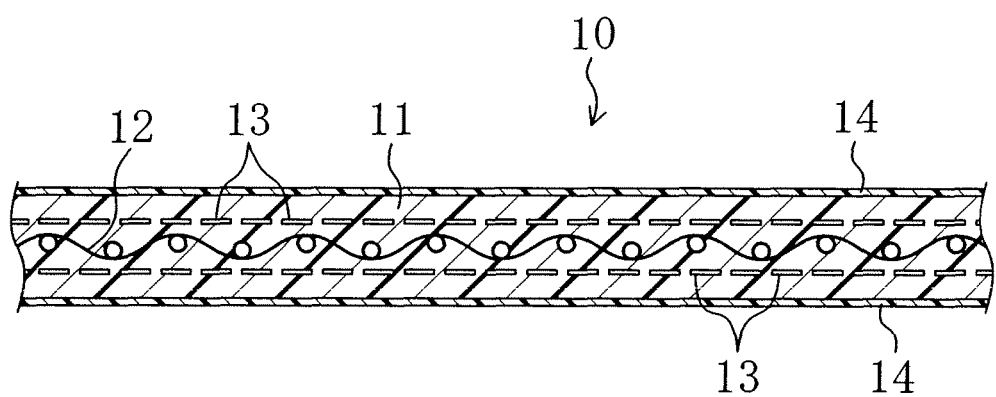
FIG. 1 is a sectional view of a SMC sheet in accordance with the embodiment.

FIG. 1 shows a SMC sheet 10 in accordance with the present embodiment.

The SMC sheet 10 includes a sheet material body 11 made of a resin compound containing uncured thermosetting resin, in which a fiber sheet 12 impregnated with the thermosetting resin of the sheet material body 11 is embedded as an intermediate layer. In the SMC sheet 10, short fiber 13 is distributed on at least one side of the fiber sheet 12 in the sheet material body 11 (both sides in FIG. 1). A carrier film 14 is attached to each side of the SMC sheet 10.

In press forming a conventional SMC sheet for manufacturing a product, the material flows significantly in the peripheral part of the SMC sheet when compared with the central part thereof, so that difference in bending strength becomes significant between a part of the product which corresponds to the central part of the SMC sheet and a part thereof which corresponds to the peripheral part of the SMC sheet. Further, the product obtained by press forming the conventional SMC sheet is poor in stiffness to invite brittle fracture.

In contrast, in the SMC sheet 10 of the present embodiment, the fiber sheet 12 is embedded in the sheet material body 11. Therefore, in manufacturing a product by press forming the SMC sheet 10 of the present embodiment, the short fiber 13 is inhibited from alignment to exert anisotropy. As a result, the manufactured product has less difference in bending strength between the part thereof which corresponds to the central part of the SMC sheet 10 and the part thereof which corresponds to the peripheral part of the SMC sheet 10. In addition, the product has a property of high stiffness, high strength, and high toughness, which means that a product has high fracture deflection to cause no brittle fracture.

In the SMC sheet 10, the sheet material body 11 has a thickness of 1 to 5 mm, for example, as a whole. A layer of one side and a layer on the other side of the fiber sheet 12 in the sheet material body 11 may have the same thickness or different thicknesses and may be made of the same resin compound or different resin compounds.

The resin compound of the sheet material body 11 contains uncured thermosetting resin as a matrix resin. There are listed as the thermosetting resin, for example, unsaturated polyester resin, epoxy resin, phenolic resin, and the like. The resin compound may contain a single kind or plural kinds of thermosetting resin, and additionally contains a hardener, a catalyst, a filler, a pigment, a thickener, an inner mold lubricant, and the like.

The fiber sheet 12 has a thickness of 0.1 to 0.6 mm, for example. The content of the fiber sheet 12 is 5 to 30 mass %, for example.

The fiber sheet 12 is formed of woven fabric, braided fabric (flat-braided fabric), knitted fabric, or the like. Among these fabrics, non-stretchable woven fabric and non-stretchable braided fabric are preferable because a product having remarkably high bending strength and bending modulus can be obtained when compared with a product using a SMC sheet of which sheet material body includes only short fiber. The woven fabric forming the fiber sheet 12 may be plain weave fabric, twill fabric, satin fabric, or the like, for example. The warp and the weft forming the woven fabric have filaments of which number is 100 to 400, for example, in a case of glass fiber while being 1000 to 24000, for example, in a case of carbon fiber. The woven fabric forming the fiber sheet 12 has a weaving density of 90 to 400 g/m$^2$, for example.

The fiber material of the fiber sheet 12 may be any of, for example, organic fiber, such as PBO fiber (poly(1,4-phenylene-2,6-benzobisoxazole) fiber), aramid fiber, and the like and inorganic fiber, such as metal fiber, glass fiber, carbon fiber, and the like. The fiber sheet 12 may be made of a single kind or plural kinds of fiber material.

The fiber material forming the fiber sheet 12 may be subjected to a surface treatment using a coupling agent. The surface treatment brings the fiber sheet 12 to have excellent adhesiveness to the sheet material body 11.

The short fiber 13 has, for example, a length of 12.7 to 63.5 mm and a diameter of 9 to 15 μm in a case of glass short fiber and 5 to 7 μm in a case of carbon short fiber. The content of the short fiber 13 is 20 to 65 mass %, for example. In the case where the short fiber 13 is arranged in the layers on the respective sides of the fiber sheet 12 in the sheet material body 11, the content of the short fiber 13 may be the same or different from each other between the layers.

The material of the short fiber 13 may be any of organic fiber, such as PBO fiber, aramid fiber, and the like and inorganic fiber, such as metal fiber, glass fiber, carbon fiber, and the like, for example. The short fiber 13 may be made of a single kind or plural kinds of fiber material. In the case where the short fiber 13 is arranged in the layers on the respective sides of the fiber sheet 12 in the sheet material body 11, the material of the short fiber 13 in the layer on one side of the fiber sheet 12 may be the same as or different from that in the layer on the other side of the fiber sheet 12.

The short fiber 13 may be subjected to a surface treatment using a coupling agent. The surface treatment brings the short fiber 13 to have excellent adhesiveness to the sheet material body 11 and excellent dispersion characteristics of the short fiber 13 in the sheet material body 11.

For press forming the above SMC sheet 10 to form a product, first, the SMC sheet 10 of which area rate at charge is 50 to 80%, for example, is cut out from the SMC sheet 10 carrying the carrier films 14.

Next, a predetermined number of the SMC sheets 10 from which the carrier films 14 are peeled off are layered and are set into one of dies of a mold, and the other die is set so as to interpose the SMC sheets 10.

Subsequently, the mold is held for, for example, a period of 0.5 to 1.0 minute/mm under a temperature of 120 to 160° C. with a pressure of 5 to 12 MPa applied in the mold setting direction to the mold. During the molding, the thermosetting resin and the short fiber 13 flow within the mold and curing of the thermosetting resin proceeds.

Thereafter, the mold is opened and the resultant product is taken out therefrom.

A method for manufacturing the SMC sheet 10 will be described next.

Figure 2:
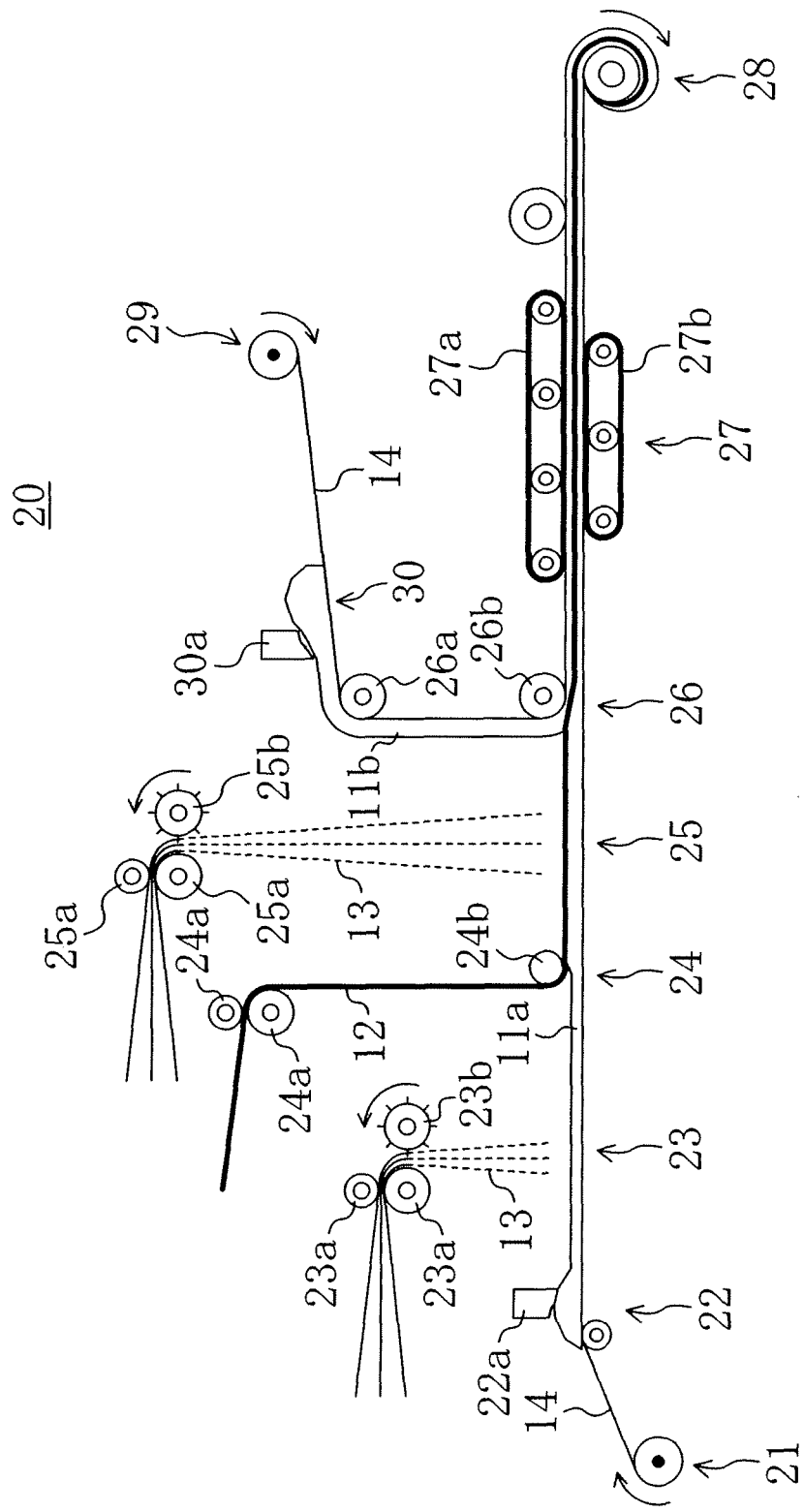
FIG. 2 is a diagram showing a SMC sheet manufacturing method in accordance with the embodiment.

FIG. 2 shows a SMC sheet manufacturing apparatus 20.

The SMC sheet manufacturing apparatus 20 includes, in this order from the upstream side thereof, a lower film feeding section 21, a lower resin supply section 22, a lower short fiber supply section 23, a fiber sheet supply section 24, an upper short fiber supply section 25, a laminating section 26, a resin immersing section 27, and a SMC winding section 28. The SMC sheet manufacturing apparatus 20 further includes an upper resin supply section 30 above the laminating section 26 and near the resin immersing section 27 and an upper film feeding section 29 above the resin immersing section 27.

The lower film feeding section 21 includes a winding member, to which the carrier film 14 is wound, and feeds the carrier film 14 downstream from the winding member.

Similarly, the upper film feeding section 29 includes a winding member, to which the carrier film 14 is wound, and feeds the carrier film 14 to the upper resin supply section 30 from the winding member.

The lower resin supply section 22 includes a resin supply member (not shown) and a doctor blade 22a. The resin supply member supplies the resin compound containing the uncured thermosetting resin widthwise onto the carrier film 14 fed from the lower film feeding section 21, and the doctor blade 22a adjusts the thus supplied resin compound to a predetermined thickness, thereby forming on the carrier film 14 a lower resin layer 11a with a predetermined thickness.

The upper resin supply section 30 includes a resin supply member (not shown) and a doctor blade 30a. The resin supply member supplies the resin compound containing the uncured thermosetting resin widthwise onto the carrier film 14 fed from the upper film feeding section 29, and the doctor blade 30a adjusts the thus supplied resin compound to a predetermined thickness, thereby forming on the carrier film 14 an upper resin layer 11b with a predetermined thickness.

The lower short fiber supply section 23 includes a pair of drop rollers 23a and a cut roller 23b. The pair of drop rollers 23a drop a fiber roving extending from a fiber supply source (not shown), and the cut roller 23b cuts sequentially the thus dropped fiber roving at a predetermined fiber length so that the thus cut short fiber 13 is distributed widthwise onto the lower resin layer 11a on the carrier film 14 fed from the lower resin supply section 22.

The fiber sheet supply section 24 includes a pair of drop rollers 24a and a laying roller 24b. The pair of drop rollers 24a drop the fiber sheet 12 extending from a fiber sheet supply source (not shown), and the laying roller 24b lays the thus dropped fiber sheet 12 onto the lower resin layer 11a, in which the short fiber 13 is distributed, on the carrier film 14 fed from the lower short fiber supply section 23.

The upper short fiber supply section 25 includes a pair of drop rollers 25a and a cut roller 25b. The pair of drop rollers 25a drop a fiber roving extending from a fiber supply source (not shown), and the cut roller 25b cuts sequentially the thus dropped fiber roving at a predetermined fiber length so that the thus cut short fiber 13 is distributed widthwise onto the fiber sheet 12 on the carrier film 14 fed from the fiber sheet supply section 24.

The laminating section 26 includes an upper guide roller 26a and a lower laminating roller 26b. The guide roller 26a guides downward the upper resin layer 11b on the carrier film 14 fed from the upper resin supply section 30, and the laminating roller 26b laminates the thus guided upper resin layer 11b onto the fiber sheet 12, in which the short fiber 13 is distributed, on the carrier film 14 fed from the upper short fiber supply section 25, thereby forming a sheet-like composite.

The resin immersing section 27 includes a pair of upper and lower belt drive apparatuses 27a, 27b each including a plurality of rollers to which a mesh belt is trained. The mesh belts pinch, press, and iron from up and down the sheet-like composite fed from the laminating section 26 to allow the fiber sheet 12 to be impregnated with the resin compound and be degasified. Thus, the SMC sheet 10 is manufactured.

The SMC winding section 28 includes a winding roller for winding the thus manufactured SMC sheet 10 fed from the resin immersing section 27 with the carrier films 14 laminated on the respective sides thereof.

Test Evaluation

Sample Articles for Test Evaluation

Working Example

The same SMC sheet as that of the above embodiment, which includes the short fiber on both sides of the fiber sheet, was manufactured as Working Example. The material composition is as follows.

For preparing the resin compound forming the sheet material body, an organic peroxide hardener of 1.0 weight part, a polymerization inhibitor of 0.6 weight part, a thickener of 13.0 weight parts, and an inner mold lubricant of 5.0 weight parts are mixed with vinyl ester resin of 100 weight parts as a matrix resin. Ripoxy H600 (product name) by SHOWA HIGHPOLYMER CO., LTD was used as the matrix resin. PERBUTYL Z (product name) by NOF CORPORATION was used as the organic peroxide hardener. TBH (product name) by SEIKO CHEMICAL CO., LTD. was used as the polymerization inhibitor. I•143L (product name) by The Dow Chemical Company was used as the thickener. ZNS•P (product name) by ADEKA CORPORATION was used as the inner mold lubricant.

As the fiber sheet, plain weave fabric of carbon fiber, TORAYCA Fabrics (product name) by Tray Industries, Inc. at a weaving density of 315 g/m$^2$ was used.

Referring to the short fiber, glass short fiber, ERS4800 (product name) by Central Glass Fiber Co., Ltd. with a fiber length of 25.4 mm was used. The content of the glass short fiber was set at 39 mass %.

Comparative Example 1

The same SMC sheet as that of Working Example except that the fiber sheet is not provided was manufactured as Comparative Example 1 (the content of glass short fiber was set at 39 mass %).

Comparative Example 2

As Comparative Example 2, a SMC sheet was manufactured which is the same as that of Working Example except that: the fiber sheet is not provided; carbon short fiber, TORAYCA T700 (product name) by Toray Industries, Inc. with a fiber length of 25.4 mm was used rather than the glass short fiber; and the content thereof was set at 50 mass %.

(Test for Evaluation)

In each of Working Example and Comparative Examples 1 and 2, three SMC sheets were layered and set between the upper die at a temperature of 145° C. and a lower die at a temperature of 130° C. and was held for 600 seconds with a pressure of 10 MPa applied for press forming to thus obtain plate-shaped sample articles.

Test pieces for a bending test were cut out from respective parts of the sample articles which correspond to the central part and the peripheral part of the SMC sheets in accordance with JIS K7055 (bending test for glass fiber reinforced plastic). Then, a three-point bending test using an Instron type universal testing machine by The Instron Corporation as a test machine was performed to measure the bending strength, the bending modulus, the bending fracture deflection, and the fracture energy of each test piece. The three-point bending test was performed at a deflection speed of 1 mm/minute. The bending strength means bending stress at an instant when a test piece fractures. The bending modulus means a ratio between the bending stress within a proportional limit and deflection corresponding thereto. The bending fracture deflection means deflection corresponding to the bending fracture strength. The fracture energy is an energy required for a test piece to fracture.

(Results of Test Evaluation)

Figure 3:
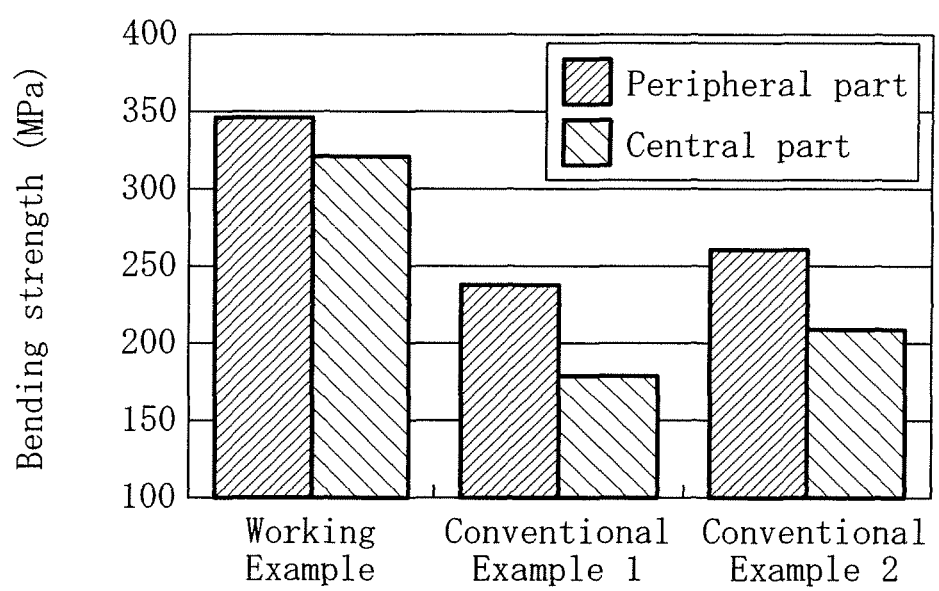
FIG. 3 is a graph indicating each bending strength of respective parts of sample articles which correspond to the central parts of the respective SMC sheets and respective parts thereof which correspond to the peripheral parts of the respective SMC sheets.

FIG. 3 indicates the bending strength of the respective parts of the sample articles which correspond to the central parts and the peripheral parts of the respective SMC sheets.

The graph of FIG. 3 proves that the use of the SMC sheets of Working Example can attain a product having small difference in bending strength between a part corresponding to the central part of the SMC sheet and a part corresponding to the peripheral part thereof when compared with the case using those of Comparative Examples 1 and 2 which include no fiber sheet.

Figure 4:
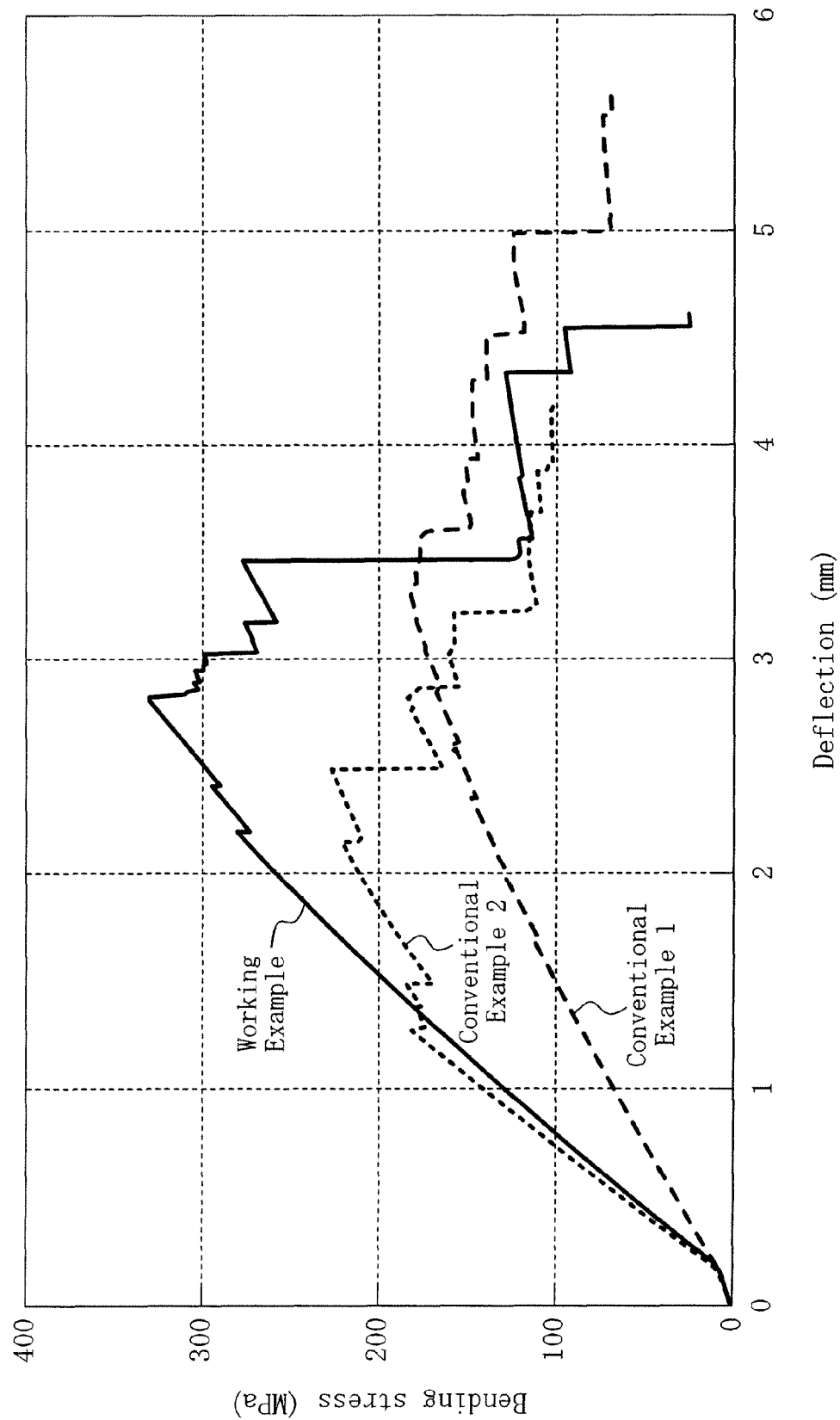
FIG. 4 is a graph showing the relationship between the deflection and the bending stress of the sample articles.

FIG. 4 shows the relationship between the deflection and the bending stress of the central parts of the sample articles. Table 1 indicates the bending fracture strength, the bending modulus, the bending fracture deflection, and the fracture energy of the central part of each sample article.

TABLE 1

|  | Working Example | Comparative Example 1 | Comparative Example 2 |
| --- | --- | --- | --- |
| Bending strength (MPa) | 334.6 | 179.9 | 235.9 |
| Bending modulus (GPa) | 12.9 | 6.7 | 15.8 |
| Bending fracture deflection (mm) | 2.6 | 3.6 | 2.3 |
| Fracture energy (J) | 110.2 | 86.8 | 45.5 |

These results proves that the use of the SMC sheet of Working Example can attain a product having remarkably high bending strength and bending modulus when compared with the case using those of Comparative Examples 1 and 2 which includes no fiber sheet.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. A SMC sheet comprising:
    a sheet material body made of a resin compound containing uncured thermosetting resin; and
    a fiber sheet embedded as an intermediate layer in the sheet material body such that first and second layers of said sheet material body are in contact with first and second sides of said fiber sheet, said fiber sheet being impregnated with the thermosetting resin of the sheet material body,
    wherein reinforcing fiber is distributed in at least one of said first and second layers of the sheet material body contacting first and second sides of the fiber sheet, the fiber sheet is woven fabric, knitted fabric, or braided fabric, and the fiber sheet is formed of PBO fiber, aramid fiber, metal fiber, glass fiber, or carbon fiber, the fiber sheet has a thickness of 0.1 to 0.6 mm, the thickness of the sheet material body is 1 to 5 mm, the thickness of the fiber sheet is 10-12% of the sheet material body, the fiber sheet has a content of 5 to 30 mass %, the reinforcing fiber has a length of 12.7 to 63.5 mm, the sheet material body extends beyond the fiber sheet and beyond the reinforcing fiber on either side of the SMC sheet, and all of the reinforcing fiber in the first and second layers is substantially randomly aligned with respect to an axis so that a bending strength between a peripheral part and a central part is substantially equal.

2. The SMC sheet of claim 1, wherein the thermosetting resin is unsaturated polyester resin, epoxy resin, or phenolic resin.

3. An SMC sheet comprising:

a sheet material body made of a resin compound containing uncured thermosetting resin; and a fiber sheet embedded as an intermediate layer in the sheet material body and impregnated with the thermosetting resin of the sheet material body, wherein the fiber sheet is woven fabric, knitted fabric, or braided fabric, and reinforcing fiber is distributed on both sides of the fiber sheet in the sheet material body, and wherein the fiber sheet is formed of PBO fiber, aramid fiber, metal fiber, glass fiber, or carbon fiber, the fiber sheet has a thickness of 0.1 to 0.6 mm, and the thickness of the sheet material body is 1 to 5 mm, the thickness of the fiber sheet is 10-12% of the sheet material body, the fiber sheet has a content of 5 to 30 mass %, the reinforcing fiber has a length of 12.7 to 63.5 mm, and the sheet material body extends beyond the fiber sheet and beyond the reinforcing fiber on either side of the SMC sheet.

4. The SMC sheet of claim 1, wherein the content of the reinforcing fiber in the SMC sheet is between 20 to 65 mass %.

5. The SMC sheet of claim 3, wherein the content of the reinforcing fiber in the SMC sheet is between 20 to mass 65%.

6. A SMC sheet comprising:

a sheet material body made of a resin compound containing uncured thermosetting resin; and a fiber sheet embedded as an intermediate layer in the sheet material body such that first and second layers of said sheet material body are in contact with first and second sides of said fiber sheet, said fiber sheet being impregnated with the thermosetting resin of the sheet material body, wherein reinforcing fiber is distributed in at least one of said first and second layers of the sheet material body contacting first and second sides of the fiber sheet, the fiber sheet is woven fabric, knitted fabric, or braided fabric, and the fiber sheet is formed of PBO fiber, aramid fiber, metal fiber, glass fiber, or carbon fiber, the fiber sheet has a thickness of 0.1 to 0.6 mm, and the thickness of the sheet material body is 1 to 5 mm, the thickness of the fiber sheet is 10-12% of the sheet material body, and the fiber sheet has a content of 5 to 30 mass %, the reinforcing fiber has a length of 12.7 to 63.5 mm, the sheet material body extends beyond the fiber sheet and beyond the reinforcing fiber on either side of the SMC sheet, and all of the reinforcing fiber in the first and second layers is substantially randomly aligned with respect to an axis so that a bending strength between a peripheral part and a central part is substantially equal.

* * * * *